United States Patent
Schuster et al.

(10) Patent No.: US 12,400,276 B2
(45) Date of Patent: *Aug. 26, 2025

(54) PERSONALIZED PAY

(71) Applicant: ADP, Inc., Roseland, NJ (US)

(72) Inventors: Eric Schuster, Alpharetta, GA (US); Dimitry Plotko, Alpharetta, GA (US)

(73) Assignee: ADP, Inc., Roseland, NJ (US)

( * ) Notice: Subject to any disclaimer, the term of this patent is extended or adjusted under 35 U.S.C. 154(b) by 181 days.

This patent is subject to a terminal disclaimer.

(21) Appl. No.: 18/137,957

(22) Filed: Apr. 21, 2023

(65) Prior Publication Data

US 2023/0334593 A1  Oct. 19, 2023

Related U.S. Application Data

(63) Continuation of application No. 17/150,872, filed on Jan. 15, 2021, now Pat. No. 11,651,445.

(51) Int. Cl.
G06Q 40/00 (2023.01)
G06Q 40/12 (2023.01)

(52) U.S. Cl.
CPC ................... G06Q 40/125 (2013.12)

(58) Field of Classification Search
None
See application file for complete search history.

(56) References Cited

U.S. PATENT DOCUMENTS

| | | | |
|---|---|---|---|
| 7,542,441 B2 | 6/2009 | Choi et al. | |
| 8,260,703 B2 | 9/2012 | Bode | |
| 8,346,586 B1 | 1/2013 | Prakken et al. | |
| 8,429,068 B1 | 4/2013 | Fasoli et al. | |
| 9,646,287 B1 | 5/2017 | Shenk et al. | |
| 10,296,578 B1* | 5/2019 | Maslin | G06V 30/414 |
| 10,339,608 B1* | 7/2019 | Haitz | G06Q 40/125 |
| 10,678,998 B1* | 6/2020 | Maslin | G06F 16/353 |

(Continued)

OTHER PUBLICATIONS

U.S. Notice of Allowance issued in corresponding U.S. Appl. No. 17/150,872, dated Jan. 5, 2023 (9 pages).

(Continued)

*Primary Examiner* — Fateh M Obaid

(74) *Attorney, Agent, or Firm* — Foley & Lardner LLP

(57) ABSTRACT

A method, computer system, and computer program product are provided for processing wage payments to an employee according to an employee-specified pay schedule. A computer system receives a payroll event for an employee. In response to receiving the payroll event, the computer system interprets a first structured data object for processing payroll. In interpreting the first structured data object, the computer system identifies an employee-specified pay schedule according to an employee context interpreted from the first structured data object. In interpreting the first structured data object, the computer system determines that a wage payment should be made to the employee according to the employee-specified pay schedule. Responsive to determining that the wage payment should be made, the computer system transmits an order for the wage payment to the employee to a specified wage payment proxy server via a network using a specified communication channel to pay the employee.

20 Claims, 8 Drawing Sheets

(56) References Cited

U.S. PATENT DOCUMENTS

| | | | |
|---|---|---|---|
| 2004/0019542 A1* | 1/2004 | Fuchs | G07C 1/14 |
| | | | 705/32 |
| 2004/0088256 A1* | 5/2004 | Klein | G06Q 10/10 |
| | | | 705/40 |
| 2004/0148215 A1 | 7/2004 | Visconti et al. | |
| 2006/0229896 A1 | 10/2006 | Rosen et al. | |
| 2006/0257188 A1 | 11/2006 | Kroetsch et al. | |
| 2008/0147561 A1 | 6/2008 | Euchner et al. | |
| 2009/0281879 A1 | 11/2009 | Pandya | |
| 2011/0275426 A1 | 11/2011 | Grabow et al. | |
| 2013/0066774 A1 | 3/2013 | Li et al. | |
| 2016/0078503 A1 | 3/2016 | Wang | |
| 2019/0043037 A1 | 2/2019 | Martin et al. | |
| 2020/0380613 A1* | 12/2020 | Hikel | G06Q 40/125 |
| 2022/0076329 A1* | 3/2022 | Sugimura | G06N 20/00 |

OTHER PUBLICATIONS

U.S. Office Action issued in corresponding U.S. Appl. No. 17/150,872, dated Apr. 4, 2022 (9 pages).
U.S. Office Action issued in corresponding U.S. Appl. No. 17/150,872, dated Jun. 21, 2022 (10 pages).

* cited by examiner

PERSONALIZED PAY

CROSS-REFERENCE TO RELATED APPLICATIONS

This application claims priority and benefit under 35 U.S.C. § 120 as a continuation of U.S. Ser. No. 17/150,872, filed Jan. 15, 2021, the contents of which are hereby incorporated by reference herein in entirety.

BACKGROUND INFORMATION

The present disclosure relates generally to an improved computer system and, in particular, to a method and apparatus for processing payroll, still more particularly, the present disclosure relates to a method and apparatus for processing payroll according to an employee-specified payroll schedule.

BACKGROUND

Information systems are used for many different purposes. The different operations performed using the information system may be referred to as transactions. For example, an information system may be used to process payroll to generate paychecks for employees in an organization. The different operations performed to generate paychecks for a pay period using the information system may be referred to as a transaction.

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization.

Every employer is faced with the regular generation of payroll for its employees. Initially, payroll processing was an arduous manual task, requiring the responsible individual to compute the base pay, applicable taxes, and other deductions for each of the employer's employees. Initially, these calculations were performed by hand. Later, these calculations were performed with the assistance of adding machines, calculators, and, finally, computers. Over time, automated systems have been developed to calculate pay, produce payroll checks, and even to make the automatic payroll deposits into an employee's bank account for employees participating in a direct deposit program.

Current payroll systems operate on a set payroll schedule, paying out compensation to employees on predetermined paydays set by the employer. This set schedule can create financial wellness challenges for employees who have to set their spending patterns based on when their employer decides they should be paid.

As a workaround, some employers allow employees to request an advance on their pay. However, current payday payroll systems require a human resources department to respond to these requests for payroll events.

Alternatively, employees may use alternative lending methods, such as payday loans, when they require money in between paydays. However, due to their typically high interest rates, payday loans are rarely helpful to an employee's long-term financial well-being.

Emerging early wage access companies have attempted to provide a technology-based, fintech solution to solve this problem. However, few payroll providers offer access to these early access services. Furthermore, existing fintech solutions do not deliver a compliant payroll payment, processing all the required regulatory filings, tax withholdings and transfer funds according to the employer's obligations. Therefore, it would be desirable to have a method and apparatus that take into account at least some of the issues discussed above, as well as other possible issues.

SUMMARY

An embodiment of the present disclosure provides a computer-implemented method for providing wage payments to an employee according to an employee-specified pay schedule. A computer system receives a payroll event for the employee. In response to receiving the payroll event, the computer system interprets a first structured data object for processing payroll. In interpreting the first structured data object, the computer system identifies an employee-specified pay schedule according to an employee context interpreted from the first structured data object. In interpreting the first structured data object, the computer system determines that a wage payment should be made to the employee according to the employee-specified pay schedule. Responsive to determining that the wage payment should be made, the computer system transmits an order for the wage payment to the employee to a specified wage payment proxy server via a network using a specified communication channel to pay the employee.

Another embodiment of the present disclosure provides a computer system comprising a hardware processor unit and a payroll processor for providing wage payments to an employee according to an employee-specified pay schedule. The payroll processor is configured to receive a payroll event for an employee. The payroll processor is further configured to interpret a first structured data object for processing payroll in response to receiving the payroll event. In interpreting the first structured data object, the payroll processor identifies an employee-specified pay schedule according to an employee context interpreted from the first structured data object. In interpreting the first structured data object, the payroll processor determines that a wage payment should be made to the employee according to the employee-specified pay schedule. In interpreting the first structured data object, the payroll processor transmits an order in response to determining that the wage payment should be made. The order for the wage payment to the employee is transmitted to a specified wage payment proxy server via a network using a specified communication channel to pay the employee.

Yet another embodiment of the present disclosure provides a computer program product for providing wage payments to an employee according to an employee-specified pay schedule. The computer program product comprises a computer readable storage media, and program code stored on the computer-readable storage media. The program code includes code for receiving a payroll event for the employee. The program code includes code for interpreting a first structured data object for processing payroll in response to receiving the payroll event. The program code for interpreting the first structured data object includes program code for identifying an employee-specified pay schedule according to an employee context interpreted from the first structured data object; program code for determining that a wage payment should be made to the employee according to the employee-specified pay schedule; and program code for transmitting an order for the wage payment to the employee to a specified wage payment proxy server via a network using a specified communication channel to pay the employee in response to determining that the wage payment should be made.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

As used herein, "a group of", when used with reference to items, means one or more items. For example, "a group of reports" is one or more reports.

Further, the phrase "a set of" or "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 1:
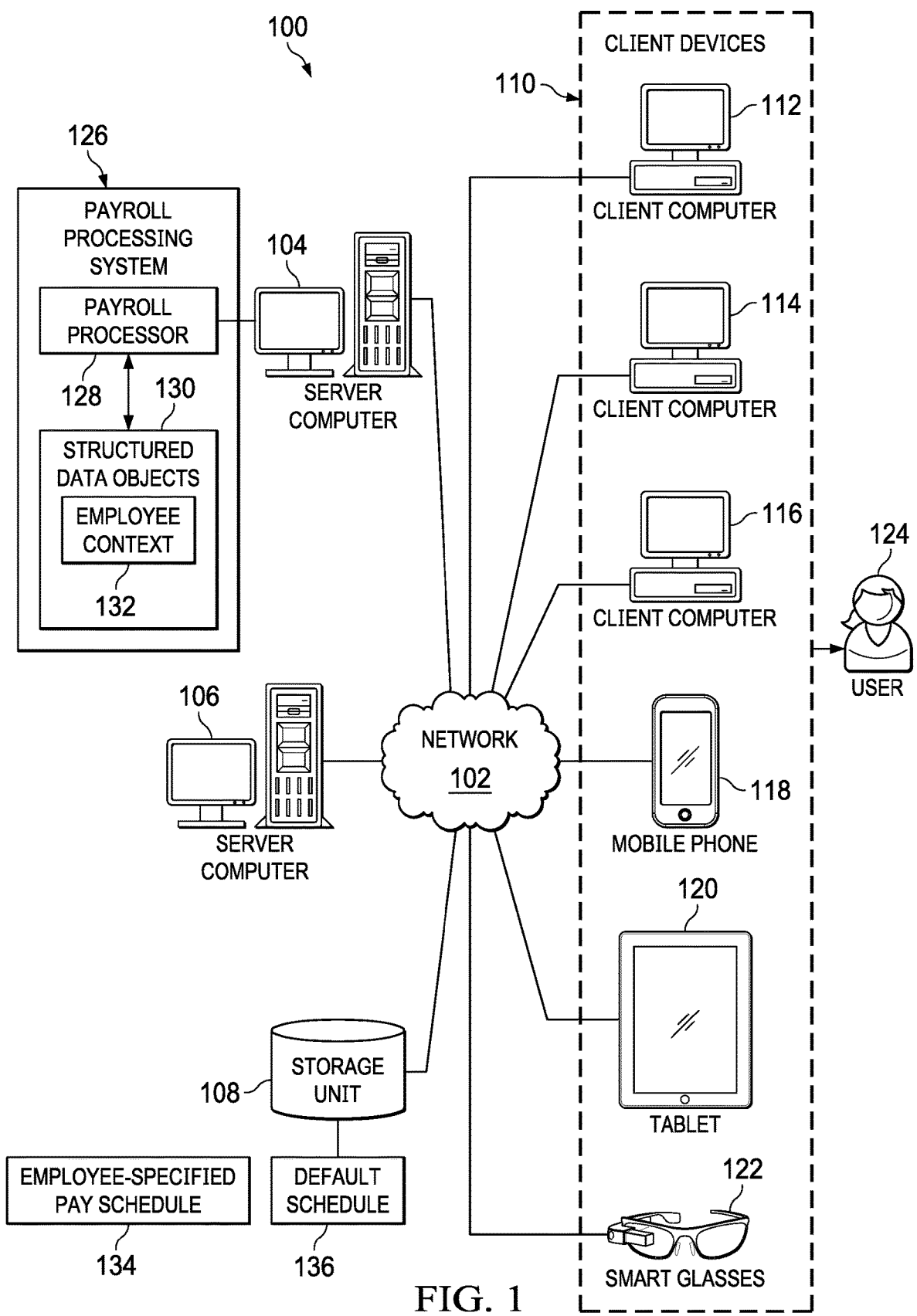
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within Network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122, as well as a smartwatch or smart speaker (not shown).

In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, Network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In this illustrative example, user 124 can use one or more of client devices 110 to interact with payroll processing system 126. Payroll processing system 126 is an application for providing wage payments to an employee according to an employee-specified pay schedule.

Payroll processing system 126 provides the ability of a payroll engine to accept an employee specific, personalized payroll schedule that does not conform to the standard payroll practices of the employer. Payroll processing system 126. Utilizing a payroll processor 128 that interprets structured data objects 130 allows payroll processing system 126 to perform all the calculations necessary to provide a fully compliant payroll payment, including processing all required regulatory filings, tax withholdings, and transfer funds to fulfill the employer's obligations. Because payroll calculations determined within employee context 132 specified by the structured data objects 130, payroll practitioners are empowered to issue payments according to employee-specified pay schedule 134, without the incremental effort necessary to process different payroll runs that deviate from an employer-defined default schedule 136.

Payroll processing system 126 provides a technical solution that overcomes a technical problem of quickly and easily delivering a compliant payroll payment. Payroll processing system 126 determines all payroll calculations within employee context 132 specified by the structured data objects 130. Performing payroll calculations in this manner enables payroll processing system 126 to perform all the calculations necessary to provide a fully compliant payroll payment, including processing all required regulatory filings, tax withholdings, and transfer funds to fulfill the employer's obligations more easily and quickly. As a result, this technical solution to the technical problem of processing payroll payments provides a technical effect in which payroll can be processed according to employee-specified pay schedule 134 more easily and quickly while requiring less knowledge or oversight from payroll practitioner.

Figure 2:
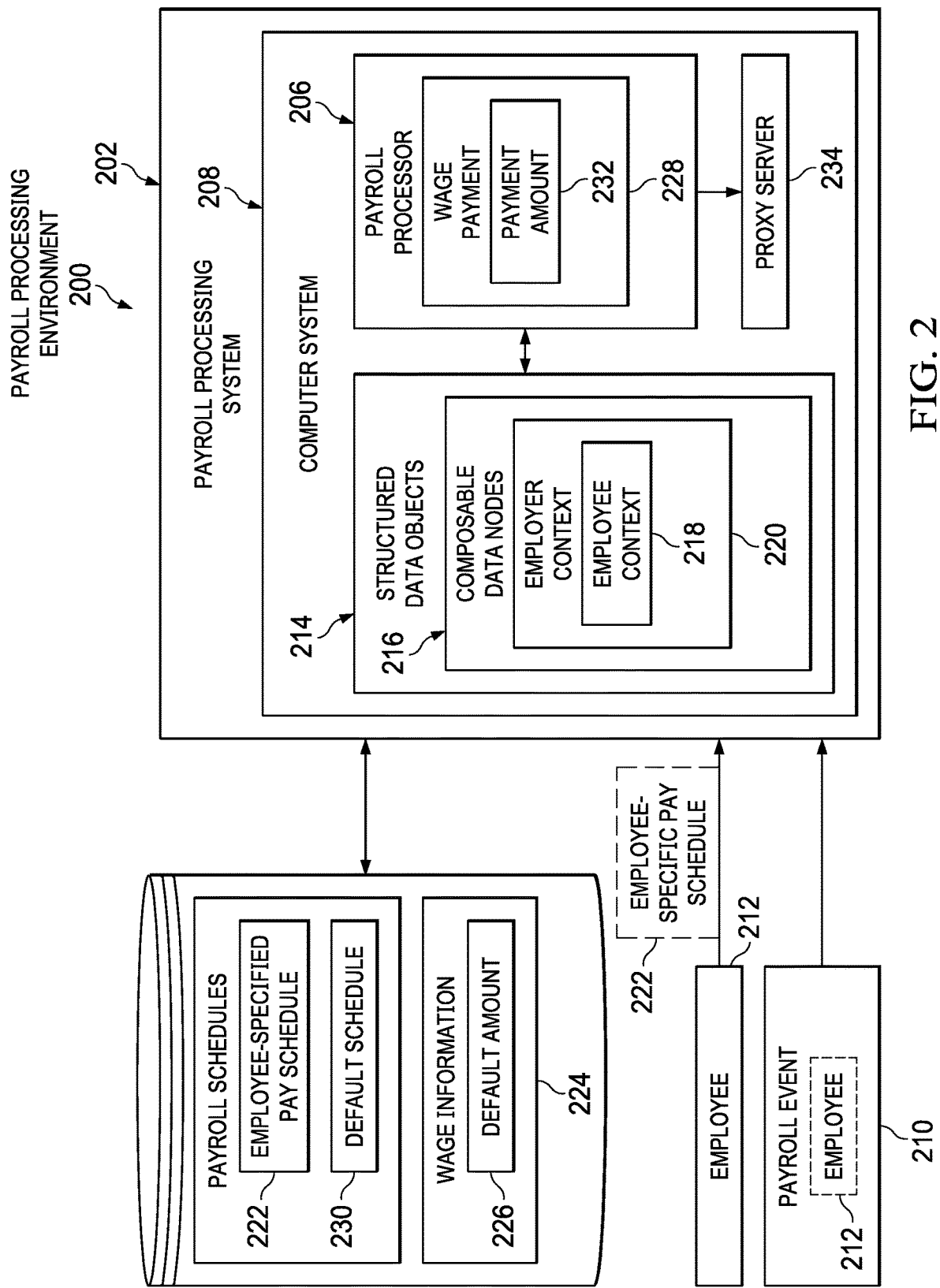
FIG. 2 is a block diagram of payroll processing environment in accordance with an illustrative embodiment.

With reference now to FIG. 2, a block diagram of payroll processing environment is depicted in accordance with an illustrative embodiment. In this illustrative example, payroll processing environment 200 includes components that can be implemented in hardware such as the hardware shown in network data processing system 100 in FIG. 1.

Payroll processing environment 200 is an environment in which payroll processing system 202 provides services for providing wage payments to an employee according to an employee-specified pay schedule. As depicted, payroll processing environment 200 includes payroll processing system 202. Payroll processing system 202 is an example of payroll processing system 126 of FIG. 1.

Payroll processor 206 can be implemented in software, hardware, firmware or a combination thereof. When software is used, the operations performed by payroll processor 206 can be implemented in program code configured to run on hardware, such as a processor unit. When firmware is used, the operations performed by payroll processor 206 can be implemented in program code and data and stored in persistent memory to run on a processor unit. When hardware is employed, the hardware may include circuits that operate to perform the operations in payroll processor 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Payroll processing system 202 can be implemented in computer system 208. Computer system 208 is a physical hardware system and includes one or more data processing systems. When more than one data processing system is present in computer system 208, those data processing systems are in communication with each other using a communications medium. The communications medium may be a network. The data processing systems may be selected from at least one of a computer, a server computer, a tablet, or some other suitable data processing system. When a number of processors execute instructions for a process, the number of processors can be on the same computer or on different computers in computer system 208. In other words, the process can be distributed between processors on the same or different computers in computer system 208.

In one illustrative example, employee 212 can interact with payroll processing system using one or more client devices, such as client devices 110 of FIG. 1. As depicted, employee 212 can interact with payroll processing system 202 to generate employee-specified pay schedule 222. Employee-specified pay schedule 222 is a pay schedule that overrides default schedule 230 specified by an employer of employee 212.

In one illustrative example, employee-specified pay schedule 222 is selected from the group consisting of an hourly schedule, a shift-wise schedule, a daily schedule, a bidaily schedule, a semiweekly schedule, a weekly schedule, a biweekly schedule, a semimonthly schedule, a monthly schedule, a bimonthly schedule, a lunar schedule, and a quarterly schedule, as well as other periodic schedules.

In one illustrative example, employee-specified pay schedule 222 is an ad-hoc schedule that may not follow a regular periodic interval. For example, employee 212 may select specific days of the month on which to be paid, such as the $1^{st}$, $10^{th}$, $15^{th}$, and $28^{th}$ of each month; on the $1^{st}$ and $3^{rd}$ Tuesdays of each month, as well as any other combination that the employee may desire. In another example, employee 212 may select specific days of the week on which to be paid, such as on Mondays and Wednesdays, or any other combination they desire]

In this illustrative example, payroll processing system 202 is configured to receive a payroll event 210 for an employee 212. Payroll event 210 can be selected from a timeclock event for the employee 212, a list of one or more salaried employees, and combinations thereof.

In response to receiving payroll event 210, payroll processing system 202 uses payroll processor 206 to interpret a first one of structured data objects 214 for processing payroll. Each of structured data objects 214 comprises a set of composable data nodes 216 that are composed according to a domain-specific language to form one of structured data objects 214. The ordered arrangement of data nodes 216 in structured data objects 214 can indicate both employee context 218 and employer context 220.

In this illustrative example, payroll processor 206 interprets structured data objects 214 to identify an employee-specified pay schedule 222 according to the employee context 218 interpreted from the first one of structured data objects 214. Employee-specified pay schedule 222 is a pay schedule that overrides default schedule 230 that is processed according to the employer context 220 interpreted from the first one of structured data objects 214.

In one illustrative example the employee-specified pay schedule 222 is a second one of structured data objects 214. Payroll processor 206 interprets the second one of structured data objects 214 within the employee context 218. The second one of structured data objects 214 overrides a property that specifies a default schedule 230 within the employer context 220 of structured data objects 214. Additionally, the second one of structured data objects 214 can further include rules for converting the default amount 226 to the payment amount 232.

In an illustrative example, wage information 224 is identified according to the employee context 218 interpreted structured data objects 214. Wage information 224 can comprise a default amount 226 of the wage payment 228 specified according to the default schedule 230. payroll processor 206 determines a payment amount 232 according to the wage information 224 and the employee-specified pay schedule 222.

In this illustrative example, payroll processor 206 interprets structured data objects 214 to determining that a wage payment 228 should be made to the employee 212 according to the employee-specified pay schedule 222. In response to determining that the wage payment 228 should be made, payroll processor 206 transmits an order for the wage payment 228 to a specified wage payment proxy server 234 via a network using a specified communication channel to pay the employee 212.

Computer system 208 can be configured to perform at least one of the steps, operations, or actions described in the different illustrative examples using software, hardware, firmware or a combination thereof. As a result, computer system 208 operates as a special purpose computer system in which payroll processor 206 in computer system 208 enables providing wage payments to an employee according to an employee-specified pay schedule. In the illustrative example, the use of payroll processor 206 in computer system 208 integrates processes for providing wage payments into a practical application that increases the performance of computer system 208 when providing wage payments according to an employee-specified pay schedule. In other words, payroll processor 206 in computer system 208 is directed towards a practical application of processes that are integrated into payroll processor 206 in computer system 208 that provide wage payments according to an employee-specified pay schedule.

In this illustrative example, computer system 208 utilizes payroll processor 206 in a manner that that results in payroll processing system 202 being capable of providing wage payments to an employee according to an employee-specified pay schedule. In this manner, payroll processor 206 for in computer system 208 provides a practical application of a method for providing wage payments to an employee according to an employee-specified pay schedule such that the functioning of computer system 208 is improved when using payroll processor 206.

Figure 3:
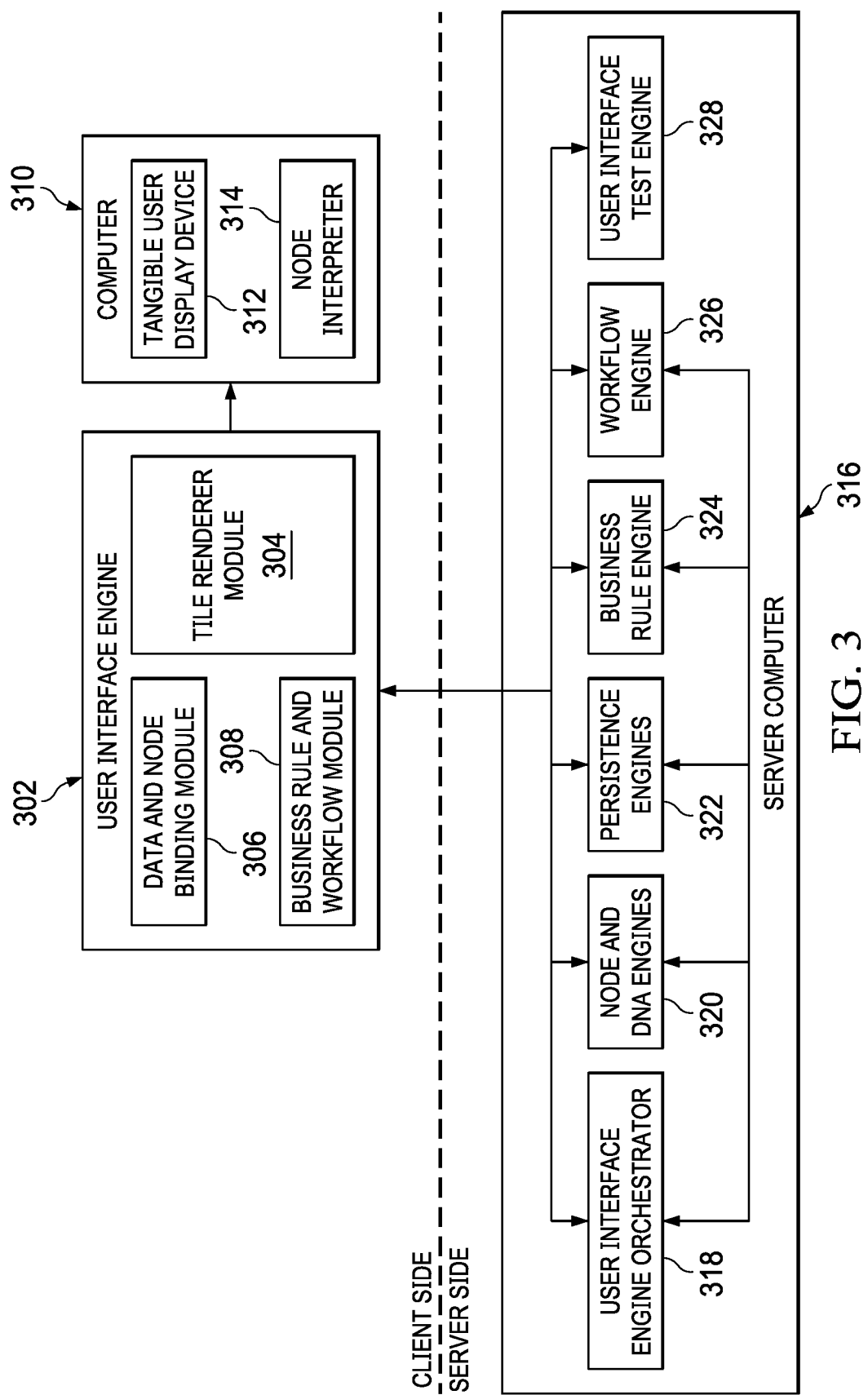
FIG. 3 is a block diagram illustrating an integrated development system in accordance with an illustrative embodiment.

FIG. 3 is a block diagram illustrating an integrated development system depicted in accordance with an illustrative embodiment. Integrated development system 300 may be used to manipulate composable data nodes to build at least one of business rules, mini-apps, and apps. Integrated development system 300 is one example of an integrated development system for composing structured data objects such as structured data objects 214 of FIG. 2.

User interface engine 302 is computer code, underlying data and structured data objects which provide underlying functionality and implementation capability for application designers using integrated development system 300. Primarily, user interface engine 302 operates client-side, meaning that user interface engine 302 operates on a specific client user's computer, such as one or more of client devices 110 of FIG. 1. In one illustrative example, user interface engine 302 could be a web browser or an extension to a web browser.

Underlying the user interface, user interface engine 302 may include one or more modules. As depicted, user interface engine 302 includes tile renderer module 304, data and node binding module 306, and business rule and workflow module 308. Each module may be considered a collection of software or computer code which implements the functionality of the module.

Tile renderer module 304 is computer code which computer 310 may use to render tiles on tangible user display device 312. Tile renderer module 304 may receive input from the user, from data and node binding module 306, and from business rule and workflow module 308 to change and manipulate both the functionality of computer 310, which is used to execute tile renderer module 304, as well as tangible user display device 312, which is used to display rendered tiles.

Data and node binding module 306 is computer code which computer 310 may use to bind data and structured data objects to the user interface, possibly a browser, so that user interface engine 302 may keep track of all of the data and structured data objects used in executing business rules and workflows, as well as rendering tiles. Additional details regarding the functionality of data and node binding module 306 is described below with respect to how data and structured data objects are used in user interface engine 302.

Business rule and workflow module 308 is computer code which computer 310 may use to create, join, merge, or otherwise manipulate composable data nodes in order to create mini-apps, collections, and bundles. Business rule and workflow module 308 is the underlying code which allows a user to create mini-apps, collections, and bundles without the user having to code any of the software being developed. Using data and structured data objects tracked by data and node binding module 306, the user can manipulate tiles rendered by tile renderer module 304. Business rule and workflow module 308 uses these composable data nodes, together with work flows and business rules to create the mini-apps, collections, or bundles in a user-perceived codeless development environment.

Node interpreter 314 is hardware or software which is used to interpret or execute business rules in a business system. Node interpreter 314 can be software residing in a web browser on computer 310. However, the illustrative embodiments are not necessarily limited to only client computers or web browsers.

Node interpreter 314 is a code interpreter designed for a domain-specific language entirely composed of structured data objects. In one illustrative example, node interpreter 314 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, node interpreter 314 executes the composition of structured data objects without compilation. Data node constructs are composed into well-defined structured data objects according to selected block types and properties, replacing the tokenization and parsing that would otherwise occur during compilation.

In some illustrative embodiments, user interface engine 302 may take advantage of some server-side services operating on one or more server computers, such as server computer 316. "Server-side" means that computer 310 communicates with server computer 316, possibly over a network such as the Internet. Server-side resources are provided to support user interface engine 302. While not always necessary for implementation of user interface engine 302, server-side resources can enhance the functionality of user interface engine 302.

For example, the server-side resources may include user interface engine orchestrator 318. In some exemplary illustrative embodiments, user interface engine orchestrator 318 may be considered part of user interface engine 302 such that user interface engine 302 operates partially both on computer 310, but also on one or more server computers, such as server computer 316.

User interface engine orchestrator 318 may serve as a proxy to speed up processing of user interface engine 302. User interface engine orchestrator 318 may retrieve structured data objects and then identify whether data queries are for customer data, business rules, or any other structured data objects. User interface engine orchestrator 318 may then request such data, objects, or code, from the data center operating server-side. User interface engine orchestrator 318 may cache retrieved data, structured data objects, code, workflows, or objects to be sent back to user interface engine 302.

Server-side services may include other components other than user interface engine orchestrator 318. For example, server-side resources could include one or more node and DNA engines 320, which can be used to manage or provide structured data objects for use in user interface engine 302. Server-side resources may also include one or more persistence engines 322, which can be used to save work done using user interface engine 302. Server-side resources may also include business rule engine 324, which may be used to create or store business rules that are used by user interface engine 302 in the user-perceived codeless building of mini-apps, collections, and bundles.

Server-side resources may also include workflow engine 326, which may be used to create or store workflows that are used by user interface engine 302 in the user-perceived codeless building of mini-apps, collections, and bundles.

Server-side resources may also include user interface test engine 328, which may be used to test both the functionality of user interface engine 302, possibly as well as the mini-apps, collections, and bundles created using user interface engine 302.

Figure 4:
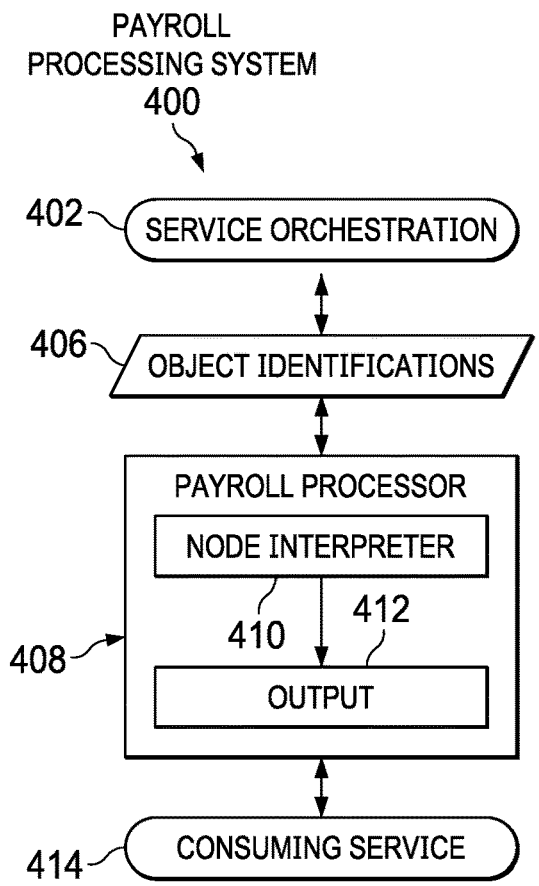
FIG. 4 is an illustration of a block diagram of an architecture of a payroll processing system based on structured data objects in accordance with an illustrative embodiment.

FIG. 4 is an illustration of a block diagram of an architecture of a payroll processing system based on structured data objects depicted in accordance with an illustrative embodiment. Payroll processing system 400 is an example of payroll processing system 202 of FIG. 2. Payroll processing system 400 is presented as a network-based business system including both server computers and client computers.

Payroll processing system 400 includes service orchestration 402. Service orchestration is a client-side or node computer which presents a user interface (UI) that allows a user to combine blocks, each representing an executor function that is a pre-defined atomic unit of code. Service orchestration 402 may be where the interpreter fetches data nodes. It is not necessarily a restful request, but may be any methodology used to provision the data nodes used by the business rule interpreter, which is the primary function of the business rule client. After the user has selected the desired atomic units of code, either alone or in combination, one or more context object identifications 406 is provided to payroll processor 408, which is a server-side computer. The identifications are the identifications against which data nodes and structured data objects can be resolved.

Payroll processor 408 includes node interpreter 410 and output 412. Node interpreter 410 interprets the data nodes provided from service orchestration 402 and directly generates output 412 as a result. Payroll processor 408 may be referred to as the engine inside the application. Payroll processor 408 may be a wrapper around the interpreter intended to separate the logic of node retrieval and resolution, not compilation, but duplicating and caching, from the actual node interpretation. Note that payroll processor 408 may also be referred to as a business rule interpreter.

Output 412 is already executable because it is generated from the pre-determined atomic units of code specified by the executor functions selected client-side. Output 412 is the output provided by payroll processor 408 corresponding to the data node and input values passed into payroll processor 408. Thus, output 412 is provided directly to consuming service 414, which executes the business rule or rules that are output by output 412.

Consuming service 414 represents the service that actually requested that behavior be performed and a business rule be executed. Consuming service 414 is not necessarily restricted to a webpage, but could be a button or any other caller of the business rule. Note that the payroll processor 408 of the illustrative embodiments are isomorphic, or environment independent.

Payroll processing system 400 is a specific implementation of the illustrative embodiments. Thus, payroll processing system 400 does not necessarily limit the claimed inventions, or other business rule systems described herein.

Figure 5:
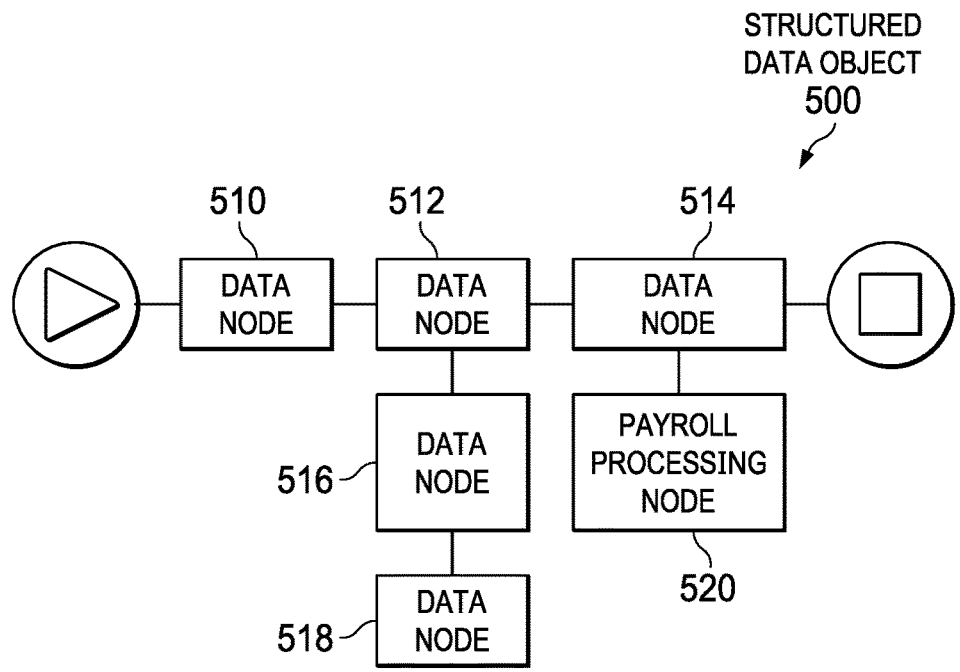
FIG. 5 is an illustration of a block diagram of a structured data object depicted in accordance with an illustrative embodiment.

With reference next to FIG. 5, an illustration of a block diagram of a structured data object is depicted in accordance with an illustrative embodiment. Structured data object 500 is an example of a composition of well-defined data nodes that can be linked together according to a domain-specific language to create mini-apps, collections, or bundles in a user-perceived codeless development environment, such as Integrated development system 300 of FIG. 3.

Structured data object 500 includes data nodes 510, 512, and 514. Data nodes 510, 512, and 514 are well-defined structured data objects that can be manipulated within data and node binding module 306 of FIG. 3 to create desired business rules. Tile renderer module 304 of user interface engine 302 may visually present data nodes 510, 512, and 514, enabling the user to build different business rules, mini-apps and apps in Integrated development system 300 of FIG. 3. Each of data nodes 510, 512, and 514 correlate to one or more functions, which in turn can be interpreted by node interpreter 314 of FIG. 3 for implementing the corresponding business rule. The different permutations of the compositions of these functions, as well as differentiated input, enable the execution of the different business rule behaviors at runtime.

The functions of data nodes 510, 512, and 514 operate inside of a context defined at the beginning of the business rule execution step, which is the target object for all symbols defined in the course of the business rule execution, as well as for all input to and output from the business rule itself. In this manner, data nodes 510, 512, and 514 act as a configuration object to the code being executed, defining an execution context (or scope being executed against) to other joined data nodes.

For example, structured data object 500 further includes data node 516. Data node 516 provides additional context for execution of related data node 512. Specifically, data node 516 may indicate that data node 512, as well as child data nodes thereof, should be interpreted within the context of data node 516.

Structured data object 500 further includes data node 518. Data node 518 provides additional context for execution of both related data node 512 and data node 516. For example, data node 518 may indicate that information required for execution of data node 512 should be requested and received from one or more web services. Data node 518 requests and returns the same context updated with the information received through the web services.

Structured data object 500 further includes payroll processing node 520. Payroll processing node 520 provides additional context for execution of related data node 514. Specifically, payroll processing node 520 may indicate a consuming service for receipt of output provided by related data node 514. Payroll processing node 520 requests and returns information to a consuming service, such as a web page.

Figure 6:
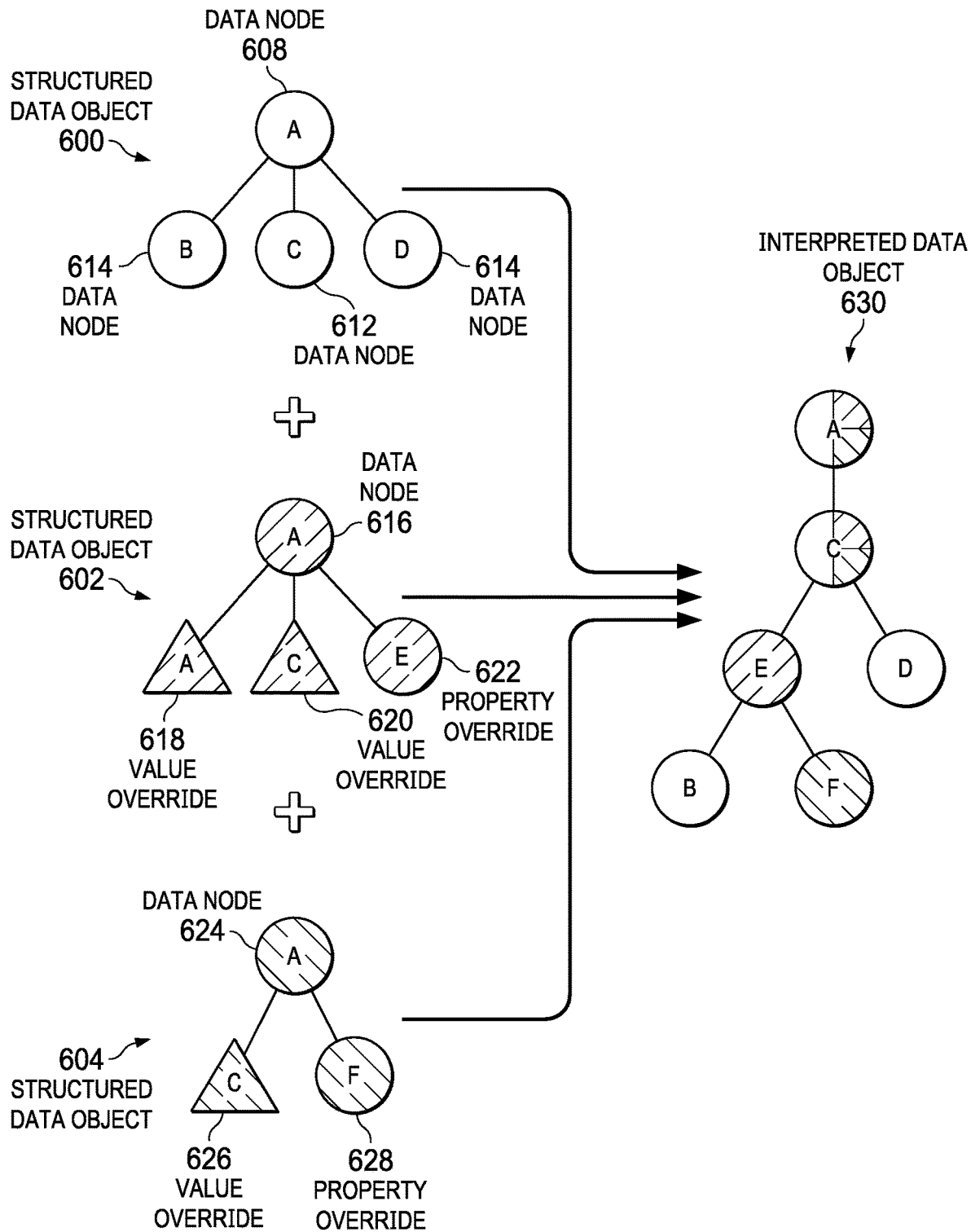
FIG. 6 is an illustration of a block diagram of structured data objects that apply number of overrides at design time depicted in accordance with an illustrative embodiment.

With reference next to FIG. 6, an illustration of a block diagram of structured data objects that apply number of overrides at design time is depicted in accordance with an illustrative embodiment. Each of structured data objects 600, 602, and 604 is an example of a structured data object, such as structured data object 500 of FIG. 5.

As depicted, structured data object 600 is a base level document, as indicated by data node 608. Structured data object 600 is a composition of data nodes 608, 610, 612, and 614 that are linked together according to a domain-specific language in a user-perceived codeless development environment, such as Integrated development system 300 of FIG. 3, to create structured data object 600. A property of structured data object 600 may specify a default pay schedule within the employer context.

Structured data object 602 is an override document, as indicated by data node 616 that may be linked to structured data object 600 according to a domain-specific language in a user-perceived codeless development environment. During interpretation, structured data object 600 is interpreted in conjunction with structured data object 602, overriding one or more default values, properties, or combinations thereof, of the base level document. In an illustrative example, value overrides 618 and 620 respectively override one or more default values of data nodes 608 and 610 in the interpreted data object 630. Property override 622 appends additional nodes within the interpreted data object 630.

Structured data object 604 is an override document, as indicated by data node 624. Structured data object 604 can be linked to structured data object 600 according to a domain-specific language in a user-perceived codeless development environment. During interpretation, structured data objects 600 and 602 are interpreted in conjunction with structured data object 604 overriding one or more default values, properties, or combinations thereof, of the base level document. In an illustrative example, value override 626 overrides one or more default values of data node 612 in the interpreted data object 630. Property override 628 appends additional nodes within the interpreted data object 630.

Figure 7:
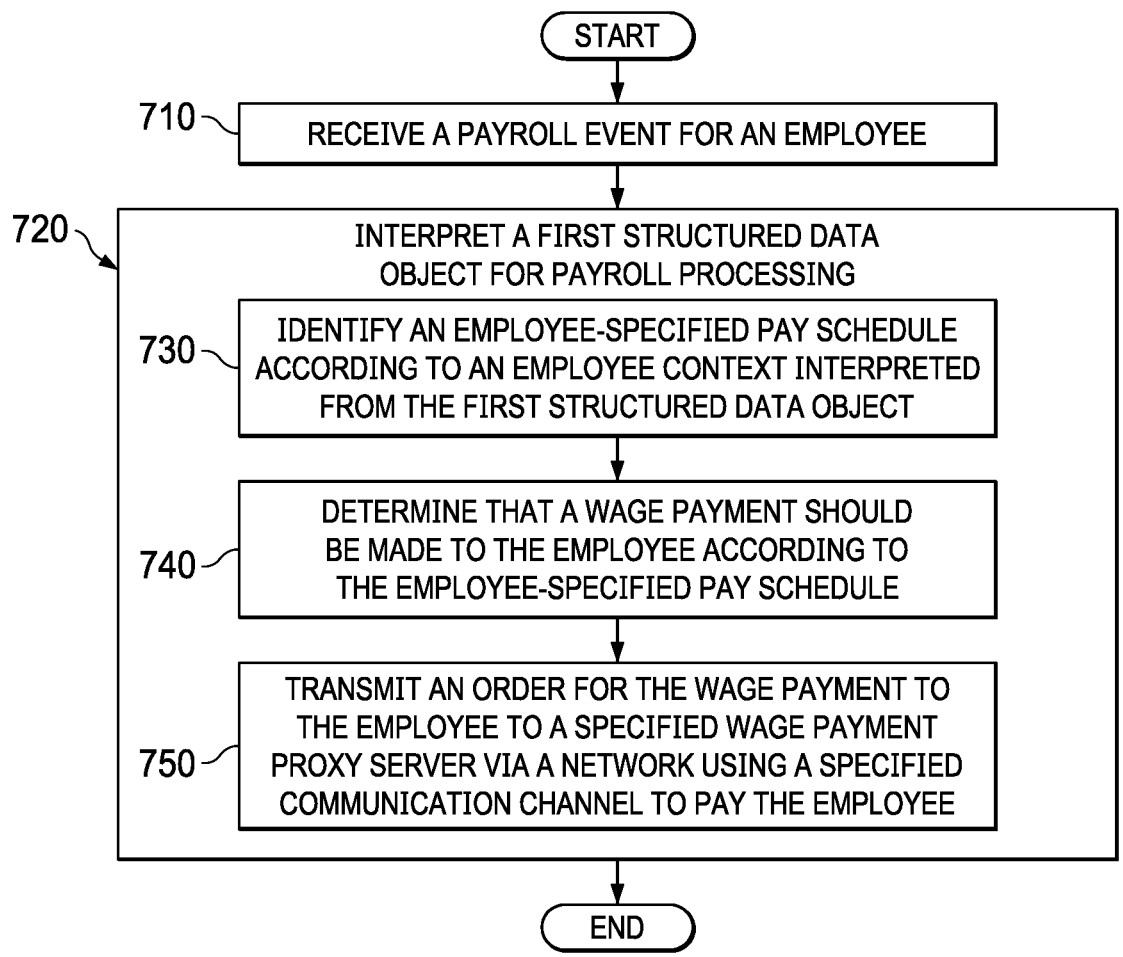
FIG. 7 is a flowchart illustrating a process for providing wage payments to an employee according to an employee-specified pay schedule in accordance with an illustrative embodiment.

With reference next to FIG. 7, a flowchart illustrating a process for providing wage payments to an employee according to an employee-specified pay schedule is depicted in accordance with an illustrative embodiment. The process of FIG. 7 can be implemented in one or more components of computer system 208 of FIG. 2, such as in payroll processor 206 of FIG. 2.

The process begins by receiving a payroll event for an employee (step 710). In one or more illustrative examples, the payroll event is selected from a timeclock event for the employee, a list of one or more salaried employees, and a calendar event.

In response to receiving the payroll event, the process interprets a first structured data object for processing payroll (step 720). In one or more illustrative examples, the first structured data object comprises a first set of composable data nodes that are composed according to a domain-specific language to form the first structured data object and to indicate the employee context and an employer context.

In this illustrative example, in interpreting the first structured data object, the process identifies an employee-specified pay schedule according to an employee context interpreted from the first structured data object (step 730). In one or more illustrative examples, the employee-specified pay schedule is selected from the group consisting of an hourly schedule, a shift-wise schedule, a daily schedule, a bidaily schedule, a semiweekly schedule, a weekly schedule, a biweekly schedule, a semimonthly schedule, a monthly schedule, and a bimonthly schedule.

In this illustrative example, in interpreting the first structured data object, the process determines that a wage payment should be made to the employee according to the employee-specified pay schedule (step 740). In response to determining that the wage payment should be made, the process transmits an order for the wage payment to the employee to a specified wage payment proxy server via a network using a specified communication channel to pay the employee (step 750), and terminates thereafter.

Figure 8:
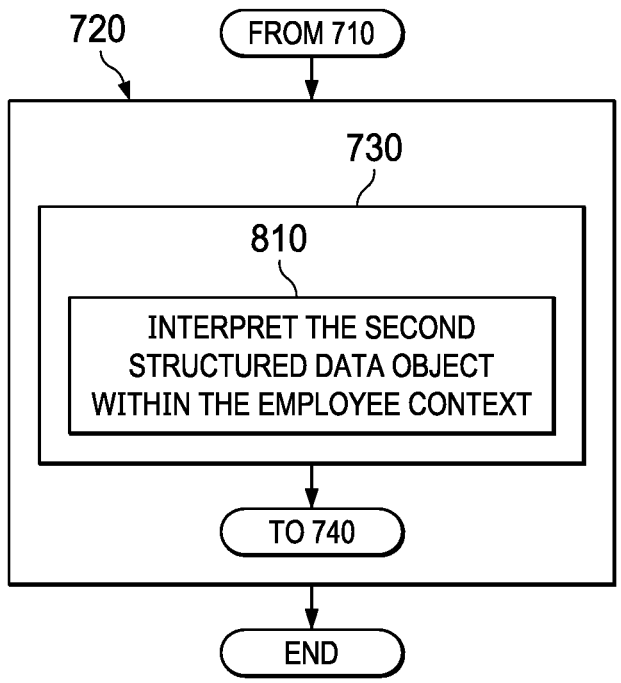
FIG. 8 is a flowchart illustrating a process for identifying an employee-specified pay schedule in accordance with an illustrative embodiment.

With reference next to FIG. 8, a flowchart illustrating a process for identifying an employee-specified pay schedule is depicted in accordance with an illustrative embodiment. The process of FIG. 8 is one illustrative example in which process step 730 of FIG. 7 can be implemented.

In this illustrative example, the employee-specified pay schedule is a second structured data object. In this illustrative implementation of step 730, the process interprets the second structured data object within the employee context (step 810), and proceeds to step 740 of FIG. 7 thereafter. The second structured data object overrides a property of the first structured data object that specifies a default pay schedule within the employer context.

Figure 9:
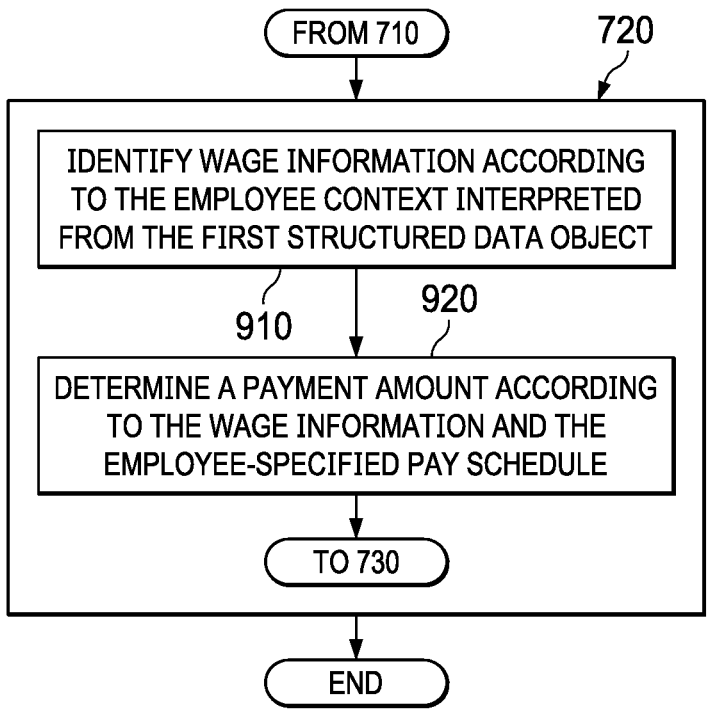
FIG. 9 is a flowchart illustrating a process for determining a payment amount in accordance with an illustrative embodiment.

With reference next to FIG. 9, a flowchart illustrating a process for determining a payment amount is depicted in accordance with an illustrative embodiment. The process of FIG. 9 is one illustrative example in which process step 720 of FIG. 7 can be implemented.

In this illustrative implementation of step 720, the process identifies wage information according to the employee context interpreted from the first structured data object (step 910). The process determines a payment amount according to the wage information and the employee-specified pay schedule (step 920), and thereafter proceeds to step 730 of FIG. 7. In this illustrative example, the wage information comprises a default amount specified according to the default pay schedule, and the second structured data object further comprises rules for converting the default amount to the payment amount.

Figure 10:
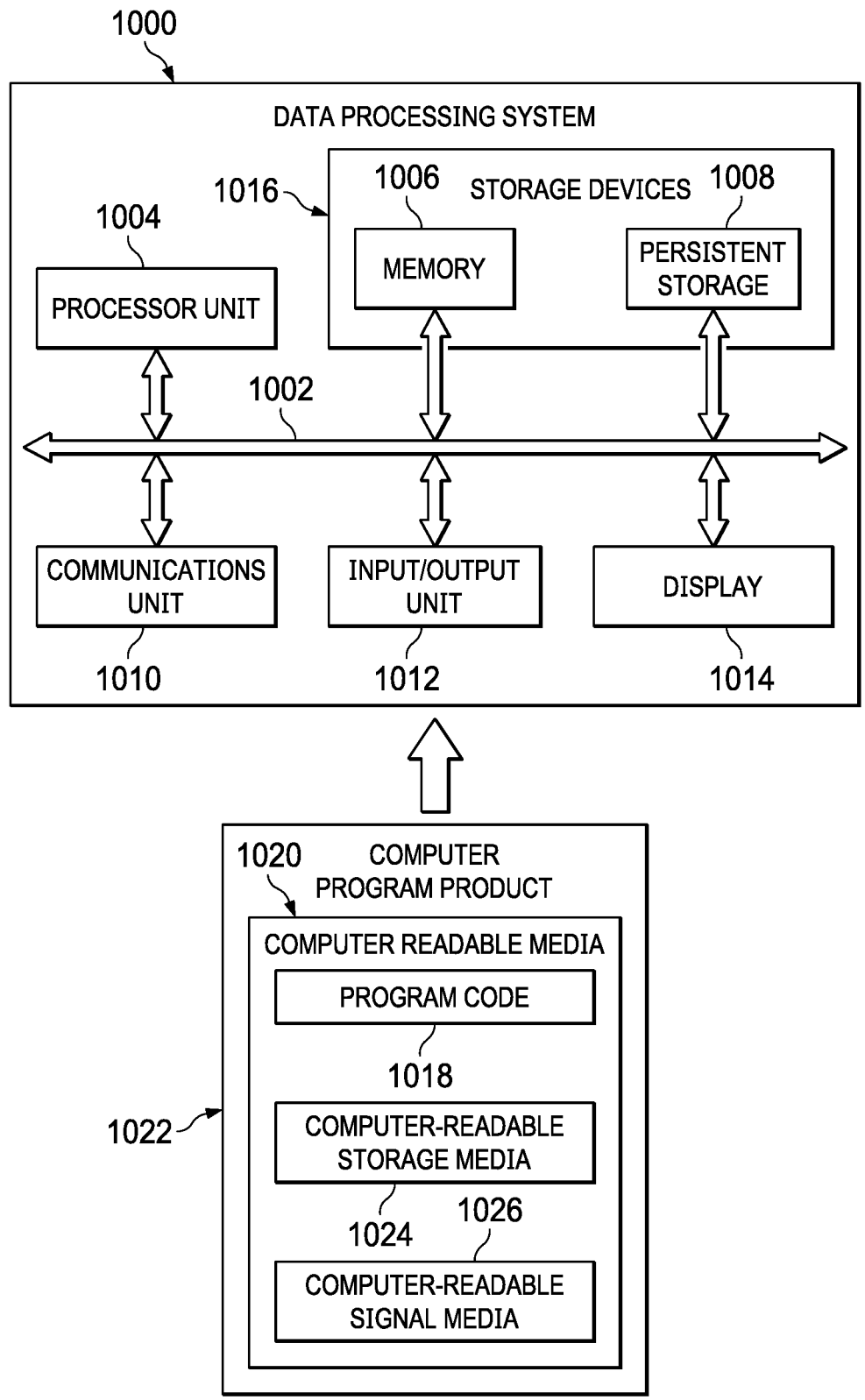
FIG. 10 is an illustration of a block diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement one or more server computers 104, 106, and client devices 110 in FIG. 1, as well as computer system 208 in FIG. 2. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUS).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The illustrative embodiments described herein provide a computer-implemented a method, computer system, and computer program product for managing reports. A subset of data fields is identified for inclusion in a new report. An intent of the new report is determined based on the subset of data fields. The intent is determined using a set of machine learning models trained from a set of existing reports and a taxonomy of human capital management (HCM) information categories. Based on the intent determined by the artificial intelligence system, a set of additional fields is predicted for the new report. The set of the additional fields is displayed in a graphical user interface on a display system.

Therefore, the illustrative embodiments described herein provide a technical solution to the technical problem of generating reports provides a technical effect in which a new reports are generated more easily and quickly while requiring less knowledge or training from an operator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method, comprising:
   receiving, by a computer system comprising one or more processors and memory, an indication of an occurrence of an event for an employee;
   identifying, by the computer system responsive to receiving the indication of the occurrence of the event, a first structured data object comprising a first transaction schedule established by an employer of the employee;
   identifying, by the computer system, a second structured data object comprising a second transaction schedule established by the employee;
   determining, by the computer system, that a property of the first transaction schedule conflicts with a property of the second transaction schedule;
   overriding, by the computer system responsive to determination that the first transaction schedule conflicts with the second transaction schedule, the property of the first transaction schedule with the property of the second transaction schedule; and
   causing, by the computer system, responsive to overriding the property of the first transaction schedule, a server to execute, via a network using a communication channel, an electronic transaction for the employee according to the property of the second transaction schedule.

2. The computer-implemented method of claim 1, wherein the event is selected from a timeclock event for the employee, a list of one or more salaried employees, and combinations thereof.

3. The computer-implemented method of claim 1, wherein the second transaction schedule is selected from a group consisting of an hourly schedule, a shift-wise schedule, a daily schedule, a bidaily schedule, a semiweekly schedule, a weekly schedule, a biweekly schedule, a semimonthly schedule, a monthly schedule, a bimonthly schedule, a lunar schedule, a quarterly schedule, and an ad-hoc schedule.

4. The computer-implemented method of claim 1, wherein identifying the second structured data object further includes:
   identifying, by the computer system, information according to an employee context indicated by the first structured data object.

5. The computer-implemented method of claim 4, wherein the information comprises a default amount specified according to the first transaction schedule, and wherein the second structured data object further comprises rules for converting the default amount to conform to the second transaction schedule.

6. The computer-implemented method of claim 1, wherein identifying the second structured data object includes:
   identifying, by the computer system, a second property of the second structured data object linked to the property of the first structured data object, wherein the property of the first structured data object and the second property of the second structured data object are linked responsive to an establishment of the second transaction schedule.

7. The computer-implemented method of claim 1, further comprising:
   interpreting, by the computer system, the second structured data object in conjunction with the first structured data object.

8. A computer system comprising:
   a hardware processor unit; and
   one or more processors configured to:
      receive an indication of an occurrence of an event for an employee;
      identify, responsive to receipt of the indication of the occurrence of the event, a first structured data object comprising a first transaction schedule established by an employer of the employee;
      identify a second structured data object comprising a second transaction schedule established by the employee;
      determine that a property of the first transaction schedule conflicts with a property of the second transaction schedule;
      override, responsive to determination that the first transaction schedule conflicts with the second transaction schedule, the property of the first transaction schedule with the property of the second transaction schedule; and
      cause, responsive to overriding the property of the first transaction schedule, a server to execute, via a network using a communication channel, an electronic transaction for the employee according to the property of the second transaction schedule.

9. The computer system of claim 8, wherein the event is selected from a timeclock event for the employee, a list of one or more salaried employees, and combinations thereof.

10. The computer system of claim 8, wherein the second transaction schedule is selected from a group consisting of an hourly schedule, a shift-wise schedule, a daily schedule, a bidaily schedule, a semiweekly schedule, a weekly schedule, a biweekly schedule, a semimonthly schedule, a monthly schedule, a bimonthly schedule, a lunar schedule, a quarterly schedule, and an ad-hoc schedule.

11. The computer system of claim 8, wherein the one or more processors are further configured to:
identify information according to an employee context indicated by the first structured data object.

12. The computer system of claim 11, wherein the information comprises a default amount specified according to the first transaction schedule, and wherein the second structured data object further comprises rules for converting the default amount to conform to the second transaction schedule.

13. The computer system of claim 8, wherein the one or more processors are further configured to:
identify a second property of the second structured data object linked to the property of the first structured data object, wherein the property of the first structured data object and the second property of the second structured data object are linked responsive to an establishment of the second transaction schedule.

14. The computer system of claim 8, wherein the one or more processors are further configured to:
interpret the second structured data object in conjunction with the first structured data object.

15. A non-transitory computer readable storage media having instructions stored thereon that, when executed by one or more processors, cause the one or more processors to implement operations comprising:
receiving an indication of an occurrence of an event for an employee;
identifying, responsive to receiving the indication of the occurrence of the event, a first structured data object comprising a first transaction schedule established by an employer of the employee;
identifying a second structured data object comprising a second transaction schedule established by the employee;
determining that a property of the first transaction schedule conflicts with a property of the second transaction schedule;
overriding, responsive to determination that the first transaction schedule conflicts with the second transaction schedule, the property of the first transaction schedule with the property of the second transaction schedule; and
causing, responsive to overriding the property of the first transaction schedule, a server to execute, via a network using a communication channel, an electronic transaction for the employee according to the property of the second transaction schedule.

16. The non-transitory computer readable storage media of claim 15, wherein the event is selected from a timeclock event for the employee, a list of one or more salaried employees, and combinations thereof.

17. The non-transitory computer readable storage media of claim 15, wherein the second transaction schedule is selected from a group consisting of an hourly schedule, a shift-wise schedule, a daily schedule, a bidaily schedule, a semiweekly schedule, a weekly schedule, a biweekly schedule, a semimonthly schedule, a monthly schedule, a bimonthly schedule, a lunar schedule, a quarterly schedule, and an ad-hoc schedule.

18. The non-transitory computer readable storage media of claim 15, wherein identifying the second structured data object further includes:
identifying information according to an employee context interpreted from the first structured data object.

19. The non-transitory computer readable storage media of claim 18, wherein the information comprises a default amount specified according to the first transaction schedule, and wherein the second structured data object further comprises rules for converting the default amount to conform to the second transaction schedule.

20. The non-transitory computer readable storage media of claim 15, wherein identifying the second transaction schedule includes:
identifying a second property of the second structured data object linked to the property of the first structured data object, wherein the property of the first structured data object and the second property of the second structured data object are linked responsive to an establishment of the second transaction schedule.

* * * * *